US006470551B1

(12) United States Patent
Provan et al.

(10) Patent No.: US 6,470,551 B1
(45) Date of Patent: Oct. 29, 2002

(54) METHOD OF MAKING A FASTENERS ARRANGEMENT WITH NOTCHES AT SPACED PRESEALS

(75) Inventors: Alexander R. Provan, Canandaigua; Thomas L. Coomber, Palmyra; Toby R. Thomas, Victor; Nathan A. Kolovich, Rochester, all of NY (US)

(73) Assignee: Pactiv Corporation, Lake Forest, IL (US)

( * ) Notice: Subject to any disclaimer, the term of this patent is extended or adjusted under 35 20 days.

(21) Appl. No.: 09/636,421

(22) Filed: Aug. 10, 2000

(51) Int. Cl.[7] .......................... B29D 5/00; A44B 19/40

(52) U.S. Cl. .......................... 29/408; 24/400; 383/37; 383/63

(58) Field of Search .......................... 29/408; 24/399, 24/400; 383/37, 63; 53/133.4, 139.2, 412

(56) References Cited

U.S. PATENT DOCUMENTS

| | | | |
|---|---|---|---|
| 3,381,592 | A | 5/1968 | Ravel |
| 3,473,589 | A | 10/1969 | Gotz |
| 3,532,571 | A | 10/1970 | Ausnit |
| RE27,174 | E | 9/1971 | Ausnit |
| 3,608,439 | A | 9/1971 | Ausnit |
| 3,613,524 | A | 10/1971 | Behr et al. |
| 3,701,191 | A | 10/1972 | Laguerrre |
| 3,701,192 | A | 10/1972 | Laguerre |
| 3,785,111 | A | 1/1974 | Pike |
| 3,839,128 | A | 10/1974 | Arai |
| 3,948,705 | A | 4/1976 | Ausnit |
| 4,094,729 | A | 6/1978 | Boccia |
| 4,196,030 | A | 4/1980 | Ausnit |
| 4,240,241 | A | 12/1980 | Sanborn, Jr. |
| 4,246,288 | A | 1/1981 | Sanborn, Jr. |
| 4,277,241 | A | 7/1981 | Schulze |
| 4,341,575 | A | 7/1982 | Herz |

(List continued on next page.)

FOREIGN PATENT DOCUMENTS

| | | |
|---|---|---|
| EP | 0 939 034 | 9/1999 |
| EP | 0 978 450 | 2/2000 |
| EP | 1 026 077 A2 | 8/2000 |
| GB | 2 085 519 | 4/1982 |
| WO | 99/24325 | 5/1999 |

*Primary Examiner*—P. W. Echols
(74) *Attorney, Agent, or Firm*—Jenkens & Gilchrist

(57) ABSTRACT

A slider-operated fastener comprises first and second opposing tracks including respective first and second interlocking profiles and respective first and second fins extending downward from the respective first and second profiles. The first and second fins are sealed to each other by a plurality of spaced preseals. After generating each preseal, a notch is formed in the profiles and upper portions of the fins at the generated preseal. To install a slider onto the fastener, the slider is initially positioned within the respective notch and then threaded onto the fastener in response to relative movement of the slider and the fastener. Either before or after the steps of forming each preseal and respective notch and installing the respective slider, the fastener is attached to a moving web of plastic film. The fastener-carrying web is later folded and sealed to form individual plastic bags. The preseals are advantageous in that they allow the fastener to be controlled during such downstream operations as notch formation and slider installation and when the fastener is tensioned by various rollers in the bag making machine. The preseals keep the interlocked profiles together and prevent them from moving longitudinally relative to each other. In addition, the preseals generally encompass the respective notches to assist in providing a leakproof barrier to entry into an interior of the fastener between the fins via the notches. This leakproof barrier is effective in the ultimately formed plastic bags.

15 Claims, 5 Drawing Sheets

U.S. PATENT DOCUMENTS

| | | | | |
|---|---|---|---|---|
| 4,355,494 | A | 10/1982 | Tilman | |
| 4,372,793 | A | 2/1983 | Herz | |
| 4,415,386 | A | 11/1983 | Ferrell et al. | |
| 4,430,070 | A | 2/1984 | Ausnit | |
| 4,437,293 | A | 3/1984 | Sanborn, Jr. | |
| 4,517,788 | A | 5/1985 | Scheffers | |
| 4,528,224 | A | 7/1985 | Ausnit | |
| 4,563,319 | A | 1/1986 | Ausnit et al. | |
| 4,581,006 | A | 4/1986 | Hugues et al. | |
| 4,582,549 | A | 4/1986 | Ferrell | |
| 4,601,694 | A | 7/1986 | Ausnit | |
| 4,617,683 | A | 10/1986 | Christoff | |
| 4,651,504 | A | 3/1987 | Bentsen | |
| 4,655,862 | A | 4/1987 | Christoff et al. | |
| 4,663,915 | A | 5/1987 | Ven Erden et al. | |
| 4,666,536 | A | 5/1987 | Van Erden et al. | |
| 4,673,383 | A | 6/1987 | Bentsen | |
| 4,691,372 | A | 9/1987 | Van Erden | |
| 4,703,518 | A | 10/1987 | Ausnit | |
| 4,709,398 | A | 11/1987 | Ausnit | |
| 4,709,533 | A | 12/1987 | Ausnit | |
| 4,710,157 | A | 12/1987 | Posey | |
| 4,782,951 | A | 11/1988 | Griesbach et al. | |
| 4,787,880 | A | 11/1988 | Ausnit | |
| 4,790,126 | A | 12/1988 | Boeckmann | |
| 4,807,300 | A | 2/1989 | Ausnit et al. | |
| 4,812,074 | A | 3/1989 | Ausnit et al. | |
| 4,840,012 | A | 6/1989 | Boeckmann | |
| 4,840,611 | A | 6/1989 | Van Erden et al. | |
| 4,844,759 | A | 7/1989 | Boeckmann | |
| 4,850,178 | A | 7/1989 | Ausnit | |
| 4,876,842 | A | 10/1989 | Ausnit | |
| 4,878,987 | A | 11/1989 | Van Erden | |
| 4,892,414 | A | 1/1990 | Ausnit | |
| 4,892,512 | A | 1/1990 | Branson | |
| 4,894,975 | A | 1/1990 | Ausnit | |
| 4,909,017 | A | 3/1990 | McMahon et al. | |
| 4,924,655 | A | 5/1990 | Posey | |
| 4,925,318 | A | 5/1990 | Sorensen | |
| 4,929,225 | A | 5/1990 | Ausnit et al. | |
| 4,941,307 | A | 7/1990 | Wojcik | |
| 4,969,309 | A | 11/1990 | Schwarz et al. | |
| 4,974,395 | A | 12/1990 | McMahon | |
| 4,993,212 | A | 2/1991 | Veoukas | |
| 5,005,707 | A | 4/1991 | Hustad et al. | |
| 5,014,498 | A | 5/1991 | McMahon | |
| 5,027,584 | A | 7/1991 | McMahon et al. | |
| 5,036,643 | A | 8/1991 | Bodolay | |
| 5,042,224 | A | 8/1991 | McMahon | |
| 5,046,300 | A | 9/1991 | Custer et al. | |
| 5,063,639 | A | 11/1991 | Boeckmann et al. | |
| 5,067,208 | A | 11/1991 | Herrington, Jr. et al. | 24/400 |
| 5,072,571 | A | 12/1991 | Boeckmann | |
| 5,085,031 | A | 2/1992 | McDonald | |
| 5,092,831 | A | 3/1992 | James et al. | |
| 5,096,516 | A | 3/1992 | McDonald et al. | |
| 5,105,603 | A | 4/1992 | Natterer | |
| 5,107,658 | A | 4/1992 | Hustad et al. | |
| 5,111,643 | A | 5/1992 | Hobock | |
| 5,116,301 | A | 5/1992 | Robinson et al. | |
| 5,127,208 | A | 7/1992 | Custer et al. | |
| 5,131,121 | A | 7/1992 | Herrington, Jr. et al. | 24/436 |
| 5,147,272 | A | 9/1992 | Richison et al. | |
| 5,161,286 | A | 11/1992 | Herrington, Jr. et al. | 24/387 |
| 5,179,816 | A | 1/1993 | Wojnicki | |
| 5,188,461 | A | 2/1993 | Sorensen | |
| 5,211,482 | A | 5/1993 | Tilman | |
| 5,247,781 | A | 9/1993 | Runge | |
| 5,254,073 | A | 10/1993 | Richison et al. | |
| 5,259,904 | A | 11/1993 | Ausnit | |
| 5,273,511 | A | 12/1993 | Boeckmann | |
| 5,322,579 | A | 6/1994 | Van Erden | |
| 5,334,127 | A | 8/1994 | Bruno et al. | |
| 5,383,989 | A | 1/1995 | McMahon | |
| 5,400,565 | A | 3/1995 | Terminella et al. | |
| 5,400,568 | A | 3/1995 | Kanemitsu et al. | |
| 5,405,478 | A | 4/1995 | Richardson et al. | 156/308.4 |
| 5,405,629 | A | 4/1995 | Marnocha et al. | |
| 5,412,924 | A | 5/1995 | Ausnit | |
| 5,415,904 | A | 5/1995 | Takubo et al. | |
| 5,425,216 | A | 6/1995 | Ausnit | |
| 5,425,825 | A | 6/1995 | Rasko et al. | |
| 5,435,864 | A | 7/1995 | Machacek et al. | |
| 5,448,807 | A | 9/1995 | Herrington, Jr. | 24/399 |
| 5,470,156 | A | 11/1995 | May | |
| 5,489,252 | A | 2/1996 | May | |
| 5,492,411 | A | 2/1996 | May | |
| 5,505,037 | A | 4/1996 | Terminella et al. | |
| 5,509,735 | A | 4/1996 | May | |
| 5,511,884 | A | 4/1996 | Bruno et al. | |
| 5,519,982 | A | 5/1996 | Herber et al. | |
| 5,525,363 | A | 6/1996 | Herber et al. | |
| 5,542,902 | A | 8/1996 | Richison et al. | |
| 5,551,127 | A | 9/1996 | May | |
| 5,551,208 | A | 9/1996 | Van Erden | |
| 5,557,907 | A | 9/1996 | Malin et al. | |
| 5,558,613 | A | 9/1996 | Tilman et al. | |
| 5,561,966 | A | 10/1996 | English | |
| 5,564,259 | A | 10/1996 | Stolmeier | |
| 5,573,614 | A | 11/1996 | Tilman et al. | |
| 5,592,802 | A | 1/1997 | Malin et al. | |
| 5,613,934 | A | 3/1997 | May | |
| 5,628,566 | A | 5/1997 | Schreiter | |
| 5,647,671 | A | 7/1997 | May | |
| 5,669,715 | A | 9/1997 | Dobreski et al. | |
| 5,682,730 | A | 11/1997 | Dobreski | |
| 5,722,128 | A | 3/1998 | Toney et al. | 24/400 |
| 5,725,312 | A | 3/1998 | May | |
| 5,782,733 | A | 7/1998 | Yeager | |
| 5,788,378 | A | 8/1998 | Thomas | |
| 5,823,933 | A | 10/1998 | Yeager | |
| 5,833,791 | A | 11/1998 | Bryniarski et al. | |
| 5,906,438 | A | 5/1999 | Laudenberg | |
| 5,924,173 | A | 7/1999 | Dobreski et al. | 24/400 |
| 6,044,621 | A | 4/2000 | Malin et al. | |
| 6,138,436 | A | 10/2000 | Malin et al. | |
| 6,138,439 | A | 10/2000 | McMahon et al. | |
| 6,286,189 | B1 | 9/2001 | Provan et al. | 24/30.5 R |
| 6,360,513 | B1 | 3/2002 | Strand et al. | 53/412 |

METHOD OF MAKING A FASTENERS ARRANGEMENT WITH NOTCHES AT SPACED PRESEALS

REFERENCE TO RELATED APPLICATIONS

The present application is being filed concurrently with U.S. patent application Ser. No. 09/636,244 entitled "Injection-Molded End Stop for a Slider-Operated Fastener," U.S. patent application Ser. No. 09/637,037 entitled "Method of Applying a Slider to a Fastener-Carrying Plastic Web," U.S. patent application Ser. No. 09/635,451 entitled "Method and Apparatus for Guiding a Fastener in a Bag Making Machine," and U.S. patent application Ser. No. 09/637,038 entitled "Method and Apparatus for Making Reclosable Plastic Bags Using a Pre-Applied Slider-Operated Fastener," all of which are incorporated herein by reference in their entireties.

FIELD OF THE INVENTION

The present invention generally relates to reclosable plastic bags and, more particularly, to a slider-operated fastener with spaced notches and associated preseals.

BACKGROUND OF THE INVENTION

In one method of making reclosable plastic bags, a continuous fastener is sealed to a moving web of thermoplastic film. To form individual bags, the web is folded along a fold parallel to the direction of web movement, and the folded web is sealed at bag-width distances apart along side seals that are generally transverse to the direction of web movement. To facilitate opening and closing the fastener, sliders are preferably applied to the fastener at bag-width distances apart.

The fastener includes a pair of interlocking profiles and a pair of fins/flanges extending downward from the respective profiles. In one technique for installing sliders on the fastener, notches are formed in the fastener at bag-width distances apart. The side seals, which are formed later in the bag manufacturing process, are aligned with the respective notches. To install a slider on the fastener via a respective notch, the slider is first positioned within the notch while the web is temporarily stopped, and then the slider is threaded onto an end of the fastener in response to relative movement of the slider and fastener. This installation technique is disclosed in U.S. patent application Ser. No. 09/307,937 (PCOS015) entitled "Zipper and Zipper Arrangements and Methods of Manufacturing the Same", filed May 10, 1999, and incorporated herein by reference in its entirety.

To form a notch, a short segment of the interlocked profiles and an upper portion of the fins extending from that segment are cut away from the fastener, leaving only a lower portion of the fins bridging opposite sides of the notch. Due to the removal of most of the fastener at the notches, the fastener can be difficult to control during such downstream operations as slider installation and when tensioned by various rollers in a bag making machine. The fastener tends to twist and distort and the fastener profiles tend to shift longitudinally relative to each other. In addition, the notches produce areas where air or liquid can potentially leak into or out of the bags eventually formed by the bag making machine.

SUMMARY OF THE INVENTION

To overcome the aforementioned shortcomings, the present invention provides a unique slider-operated fastener and method of making the same. The slider-operated fastener comprises first and second opposing tracks including respective first and second interlocking profiles and respective first and second fins extending downward from the respective first and second profiles. The first and second fins are sealed to each other by a plurality of spaced preseals. After generating each preseal, a notch is formed in the profiles and upper portions of the fins at the generated preseal. To install a slider onto the fastener, the slider is initially positioned within the respective notch and then threaded onto the fastener in response to relative movement of the slider and the fastener. Either before or after the steps of forming each preseal and respective notch and installing the respective slider, the fastener is attached to a moving web of plastic film. The fastener-carrying web is later folded and sealed to form individual plastic bags.

The preseals are advantageous in that they allow the fastener to be controlled during such downstream operations as notch formation and slider installation and when the fastener is tensioned by various rollers in the bag making machine. The preseals keep the interlocked profiles together and prevent them from moving longitudinally relative to each other. In addition, the preseals generally encompass the respective notches to assist in providing a leakproof barrier to entry into an interior of the fastener between the fins via the notches. This leakproof barrier is effective in the ultimately formed plastic bags.

BRIEF DESCRIPTION OF THE DRAWINGS

Other objects and advantages of the invention will become apparent upon reading the following detailed description and upon reference to the drawings in which.

Figure 1:
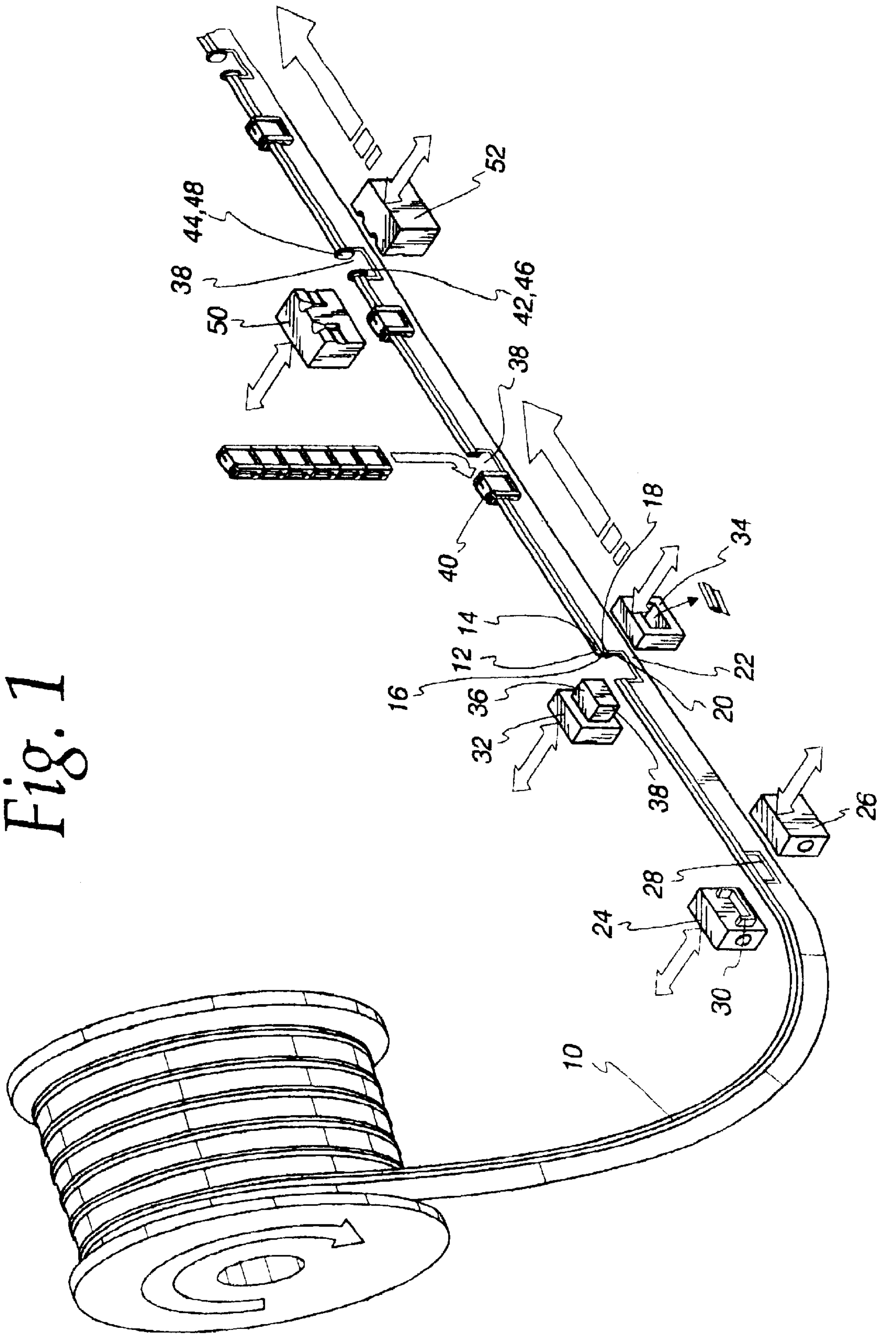
FIG. 1 depicts a method of making a slider-operated fastener.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Turning to the drawings, FIG. 1 depicts a method of making a slider-operated fastener for use in reclosable plastic bags. In the method, there is provided a continuous fastener 10 including first and second opposing tracks 12 and 14. The tracks 12 and 14 include respective first and second interlocking profiles 16 and 18 and respective first and second fins 20 and 22 extending downward from the respective profiles 16 and 18. The profile 16 preferably includes a rib, and the profile 18 preferably includes a groove for receiving the rib. Further details concerning the construction of the profiles 16 and 18 may be obtained from U.S. Pat. No. 5,007,143 to Herrington, which is incorporated herein by reference in its entirety. The fastener 10 may be unwound from a spool or the like.

The fastener 10 is conveyed by rollers and the like (not shown) to a preseal station. The preseal station includes a pair of reciprocating seal bars 24 and 26. Either both of the seal bars 24 and 26 move back and forth between open and closed positions, or one of the seal bars is stationary while the other seal bar moves back and forth. At least the seal bar 24 is heated. The other bar 26 may be heated as well, or may simply serve as a backing against which the heated seal bar 24 applies pressure when the seal bars 24 and 26 are brought together. The temperature, pressure, and dwell time of the seal bars 24 and 26 are properly adjusted to allow the seal bars 24 and 26 to impart a preseal 28. While the fastener 10 is temporarily stopped at the preseal station, the fins 20 and 22 are sealed to each other along the preseal 28. The preseal 28 preferably does not extend into the profiles 16 and 18 due to the technique for installing sliders on the fastener 10 later in the manufacturing process.

Figure 4:
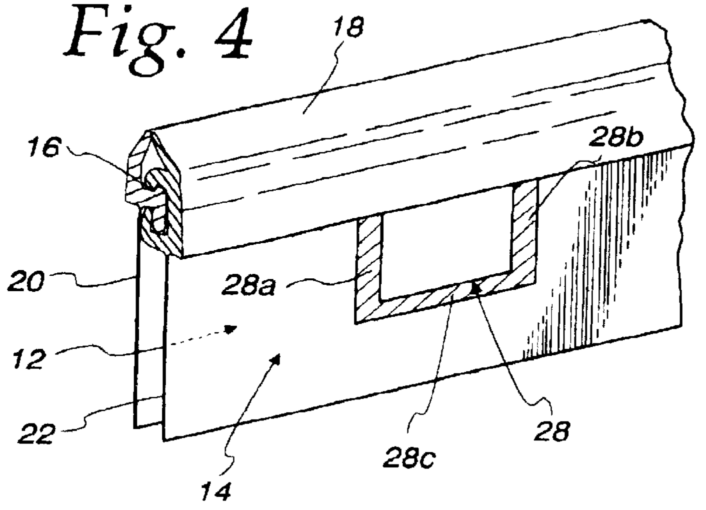
FIG. 4 is an enlarged view of a U-shaped preseal according to a first embodiment.
Figure 5:
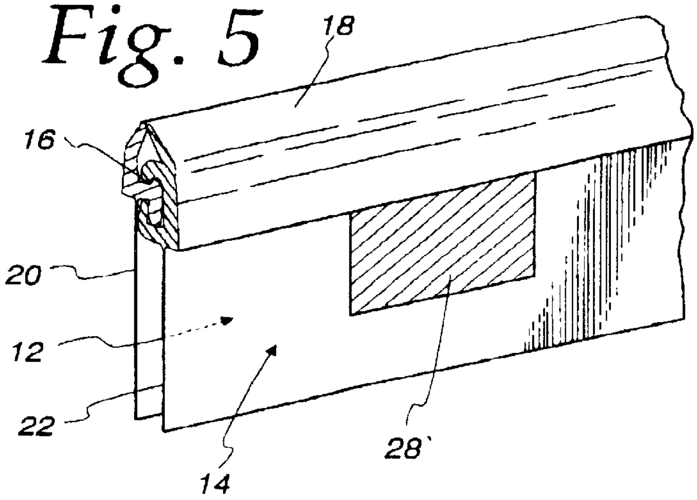
FIG. 5 is an enlarged view of a solid preseal according to a second embodiment.
Figure 6:
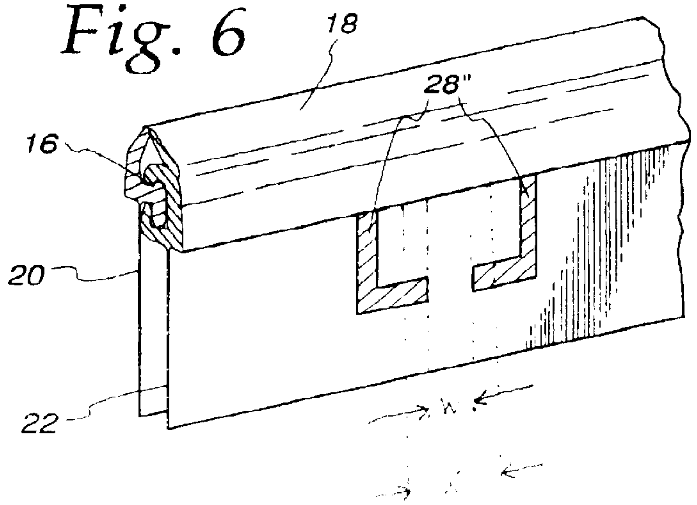
FIG. 6 is an enlarged view of a bracketed preseal according to a third embodiment.

FIGS. 4–6 illustrate different configurations of the preseal. The preseal 28 in FIG. 4 is generally U-shaped and includes a pair of opposing sides 28*a*, 28*b* and a bottom 28*c* bridging the opposing sides. The opposing sides 28*a*, 28*b* are generally located along an upper portion of the fins 20 and 22 and extend downward from the interlocked profiles 16 and 18. The bottom 28*c* extends between the lower ends of the sides 28*a*, 28*b*. The seal bar 24 has a U-shaped projection 30 corresponding to the shape of the preseal 28. The preseal 28' in FIG. 5 is solid such that the rectangular area between the opposing vertical sides of the preseal is sealed. The bracketed preseal 28" in FIG. 6 is similar to the U-shaped preseal 28 in FIG. 4 except that the bottom of the bracketed preseal 28" is interrupted by a gap. The gap has a width W less than or equal to the width X of a side seal later formed in alignment with the preseal 28". An advantage of the bracketed preseal 28" is that it minimizes the heat imparted to the lower portions of the fins 20 and 22, thereby minimizing stretching and subscquent shrinkage and wrinkles in the lower fin portions.

After forming the preseal 28, the fastener 10 is conveyed to a notching station. The notching station includes a pair of reciprocating cutters 32 and 34. Either both of the cutters 32 and 34 move back and forth between open and closed positions, or one of the cutters is stationary while the other cutter moves back and forth. The cutter 32 forms a rectangular projection, while the cutter 34 forms a rectangular hole for receiving the projection. The fastener 10 is temporarily stopped at the notching station with the preseal 28 aligned between the separated cutters 32 and 34. While the fastener 10 is stopped, the cutters 32 and 34 are brought together such that the rectangular projection of the cutter 32 punches a rectangular section 36 through the rectangular hole of the cutter 34, thereby leaving a U-shaped notch 38 in the fastener 10.

Figure 7:
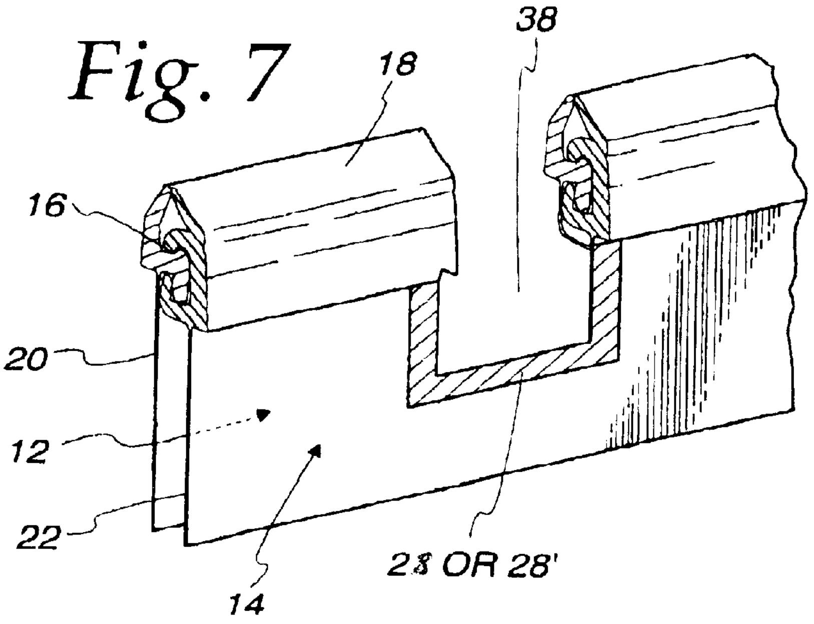
FIG. 7 is an enlarged view of a notch in the U-shaped or solid preseals of FIGS. 4 and 5.
Figure 8:
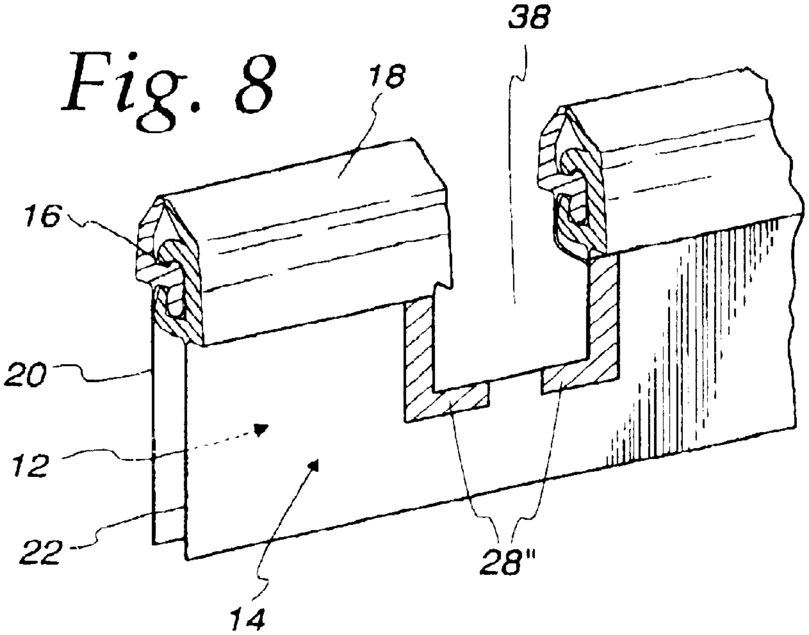
FIG. 8 is an enlarged view of a notch in the bracketed preseal of FIG. 6.

The preseal 28 generally encompasses the notch 38 and defines a periphery thereof such that the preseal provides a leakproof barrier to entry into an interior of the fastener 10 between the fins 20 and 22 via the notch 38. As discussed below, the leakproof barrier effectively prevents leaks in the reclosable plastic bags ultimately formed by the manufacturing process. FIG. 7 illustrates the notch 38 in either the U-shaped preseal 28 of FIG. 4 or the solid preseal 28' of FIG. 5. FIG. 8 illustrates the notch in the bracketed preseal 28" of FIG. 6. The bracketed preseal 28" is still effective to create the aforementioned leakproof barrier because the brackets are sized to overlap the side seal to be formed later in the manufacturing process.

After forming the notch 38, the fastener 10 is conveyed to a slider insertion station. While the fastener 10 is temporarily stopped at the slider insertion station, a slider 40 from a source of multiple sliders is positioned within the notch 38. Further details concerning the source of multiple sliders may be obtained from U.S. patent application Ser. No. 09/307,893 (PCOS013) entitled “Assembly and Accumulation of Sliders for Profiled Zippers”, filed May 10, 1999, and incorporated herein by reference in its entirety. The slider 40 is then threaded onto the fastener 10 in response to relative movement of the slider 40 and the fastener 10. Further details concerning the equipment for installing the slider 40 onto the fastener 10 via the notch 38 may be obtained from U.S. patent application Ser. No. 09/307,937 (PCOS015) entitled “Zipper and Zipper Arrangements and Methods of Manufacturing the Same”, filed May 10, 1999, and incorporated herein by reference in its entirety.

After installing the slider 40 onto the fastener 10, the fastener 10 is conveyed to an end stop applicator. The end stop applicator applies end stops 42 and 44 to the respective fastener ends 46 and 48 on opposite sides of the notch 38. In the plastic bags ultimately formed by the manufacturing process, the end stop 42 will be located at the fastener end 46 of one bag, while the end stop 44 will be located at the fastener end 48 of the adjacent bag. The end stops perform three primary functions: (1) preventing the slider 40 from going past the ends of the fastener, (2) holding the profiles together to resist stresses applied to the profiles during normal use of the plastic bag, and (3) minimizing leakage from inside the plastic bag out through the fastener ends.

In one embodiment, the end stop applicator includes a pair of chilled, reciprocating molds 50 and 52. Either both of the molds 50 and 52 move back and forth between open and closed positions, or one of the molds is stationary while the other mold moves back and forth. While the fastener 10 is temporarily stopped, the molds 50 and 52 close around the fastener ends 46 and 48. A predetermined amount of flowable plastic material is then forced around and between the profiles 16 and 18 at the fastener ends 46 and 48 by a conventional back pressure device (not shown) coupled to the supply tube. The molds 50 and 52 form channels for receiving the plastic material and guiding it to the fastener ends 46 and 48. Further details concerning the injection-molded end stops 42 and 44 and the method of making the same may be obtained from U.S. patent application Ser. No. 09/636,244 entitled “Injection-Molded End Stop for a Slider-Operated Fastener”, filed concurrently herewith, and incorporated herein by reference in its entirety.

Instead of applying injection-molded end stops, other types of end stops may be applied to the fastener ends 46 and 48, including those disclosed in U.S. Pat. Nos. 5,924,173, 5,833,791, 5,482,375, 5,448,807, 5,442,837, 5,405,478, 5,161,286, 5,131,121, 5,088,971, and 5,067,208, which are incorporated herein by reference in their entireties. In U.S. Pat. No. 5,067,208, for example, each end stop is in the form of a fairly rigid strap/clip that wraps over the top of the fastener. One end of the strap is provided with a rivet-like member that penetrates through the fastener fins and into a cooperating opening at the other end of the strap.

While the fastener 10 is temporarily stopped in the method depicted in FIG. 1, the various stations simultaneously perform their respective functions on different parts of the continuous fastener 10 spaced approximately at bag-width distances apart. Therefore, as the preseal station forms a new preseal 28, (1) the notching station forms a new notch 38 within a previously formed preseal, (2) the slider insertion station installs a slider 40 via a previously formed notch, and (3) the end stop applicator applies new end stops 42 and 44 proximate a previously installed slider. After each of the stations has completed its respective function on the stopped fastener 10, movement of the fastener 10 is resumed. The fastener 10 is moved for approximately a bag-width distance so that the next station can perform its respective function. The preseals 28 are advantageous in that they allow the fastener 10 to be controlled during such downstream operations as notch formation, slider installation, and end stop installation and when the fastener 10 is tensioned by various rollers in the bag making machine. The preseals 28 keep the interlocked profiles 16 and 18 together and prevent them from moving longitudinally relative to each other.

After applying the end stops 42 and 44, the fastener 10 is preferably applied to a moving web of plastic film that is then formed into individual plastic bags. Alternatively, the fastener 10 may be conveyed to a storage medium, such as a spool, and placed in an intermediate storage facility, and then applied to the moving web at a later time.

Figure 2:
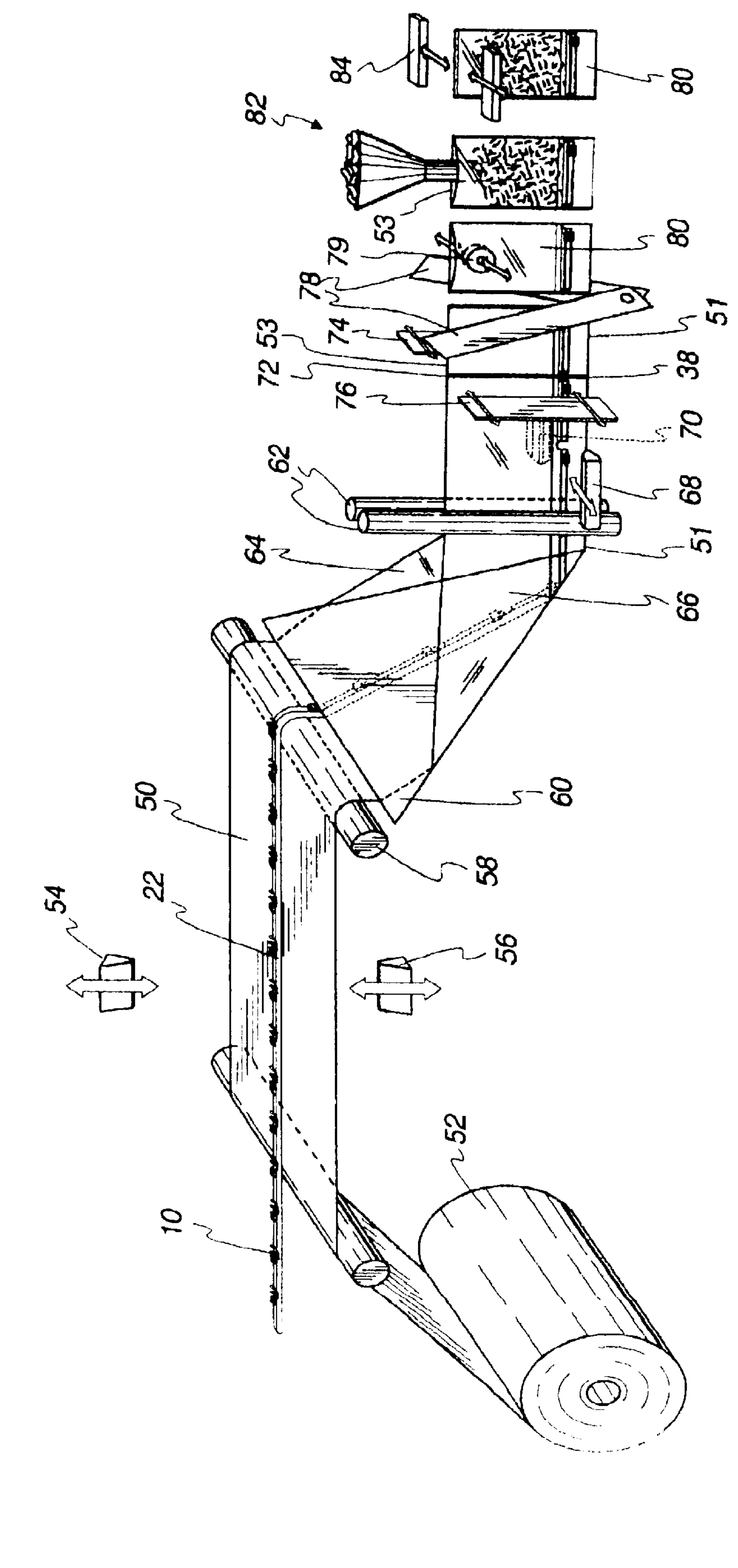
FIG. 2 depicts a method of forming, filling, and sealing reclosable plastic bags employing the slider-operated fastener.

FIG. 2 depicts a method of forming, filling, and sealing reclosable plastic bags employing the slider-operated fastener 10. The fin 20 of the fastener 10 is "tacked" or lightly sealed to a moving web 50 of plastic film unwound from a film roll 52. To tack the fastener fin 20 to the moving web 50, there is provided a pair of reciprocating seal bars 54 and 56. Either both of the seal bars 54 and 56 move back and forth between open and closed positions, or one of the seal bars is stationary while the other seal bar moves back and forth. Both the fastener 10 and the web 50 are temporarily stopped while the seal bars are brought together to tack the fastener 10 to the web 50. Of course, if the fastener 10 produced by the method in FIG. 1 is conveyed directly to the web 50, as opposed to an intermediate storage facility, the stoppage of the fastener 10 and web 50 for tacking can be made to coincide with the stoppage of the fastener 10 in FIG. 1 for forming the preseal and notch and installing the slider and end stops. In an alternative embodiment, the seal bars 54 and 56 are replaced with a static heat sealing mechanism such as a hot air blower that blows heated air onto the fastener 10. The tacked fastener 10 is carried with the moving web 50 without shifting relative thereto.

After tacking the fastener 10 to the web 50, the fastener-carrying web 50 is conveyed to a folding station. At the folding station, the web 50 is folded in half with the fastener 10 inside the web 50 and proximate the fold 51. To fold the web 50, the web 50 is conveyed over a horizontal roller 58, under a triangular folding board 60, and then between a pair of closely spaced vertical rollers 62. The folded web 50 includes a pair of overlapping panels 64 and 66 joined along the fold 51.

After folding the web 50, the fastener fins 20 and 22 are permanently sealed to the respective web panels 66 and 64 by respective seal bars 68 and 70. The seal bars 68 and 70 are sufficiently wide that they generate the fin seals across the entire width of a bag produced by the method in FIG. 2. Either both of the seal bars 68 and 70 move back and forth between open and closed positions, or one of the seal bars is stationary while the other seal bar moves back and forth. The fastener-carrying web 50 is temporarily stopped while the seal bars are brought together to seal the fastener 10 to the web 50. Both of the seal bars 68 and 70 are preferably heated. The temperature, pressure, and dwell time of the seal bars 68 and 70 are properly adjusted to allow the seal bars 68 and 70 to generate the permanent fin seals. In an alternative embodiment, the seal bars 68 and 70 are replaced with a static heat sealing mechanism such as a pair of hot air blowers that blow heated air onto the respective fastener fins.

After sealing the fins 20 and 22 to the respective web panels 66 and 64, the web panels 64 and 66 are sealed to each other along a side seal 72 by a pair of reciprocating seal bars 74 and 76. The side seal 72 is transverse to a direction of movement of the folded web 50 and is aligned with a center of the notch 38 (and preseal 28). Also, the side seal 72 extends from the folded bottom 51 to an open top 53 of the folded web 50. Either both of the seal bars 74 and 76 move back and forth between open and closed positions, or one of the seal bars is stationary while the other seal bar moves back and forth. The folded web 50 is temporarily stopped while the seal bars are brought together to seal the web panels 64 and 66 to each other. At least the seal bar 74 is heated. The other bar 76 may be heated as well, or may simply serve as a backing against which the heated seal bar 74 applies pressure when the seal bars 74 and 76 are brought together. The temperature, pressure, and dwell time of the seal bars 74 and 76 are properly adjusted to allow the seal bars 74 and 76 to generate the side seal 72.

After generating the side seal 72, the folded web 50 is conveyed to a cutter 78 for separating the folded web 50 into individual plastic bags. While the folded web 50 is temporarily stopped, the cutter 78 cuts the folded web 50 along a center of the side seal 72 to produce the individual plastic bag 80. The plastic bag 80 is opened with an opening device 79 and filled with a product through its open top 53 at a filling station 82. Finally, the open top 53 is sealed by a heat sealing mechanism 84. The end result is a filled and sealed bag 80 ready for shipment to a customer such as a grocery store or convenience store.

While the web 50 is temporarily stopped in the method depicted in FIG. 2, the various stations simultaneously perform their respective functions on different parts of the continuous web 50. For example, as the fastener 10 is tacked to the web 50 by the seal bars 54 and 56, (1) the fastener fins 20 and 22 of a previously tacked section of the fastener 10 can be permanently sealed to the respective web panels 64 and 66 by respective seal bars 68 and 70, (2) the web panels 64 and 66 carrying previously sealed fastener fin sections can be sealed to each other along a side seal 72 by the seal bars 74 and 76, (3) the folded web 50 can be cut along a previously generated side seal, (4) the cut bag is opened, (5) the opened bag is positioned under a filling device that fills the bag, and (6) the filled bag is sealed closed. After each of the stations has completed its respective function on the stopped web 50, movement of the web 50 is resumed.

Figure 3:
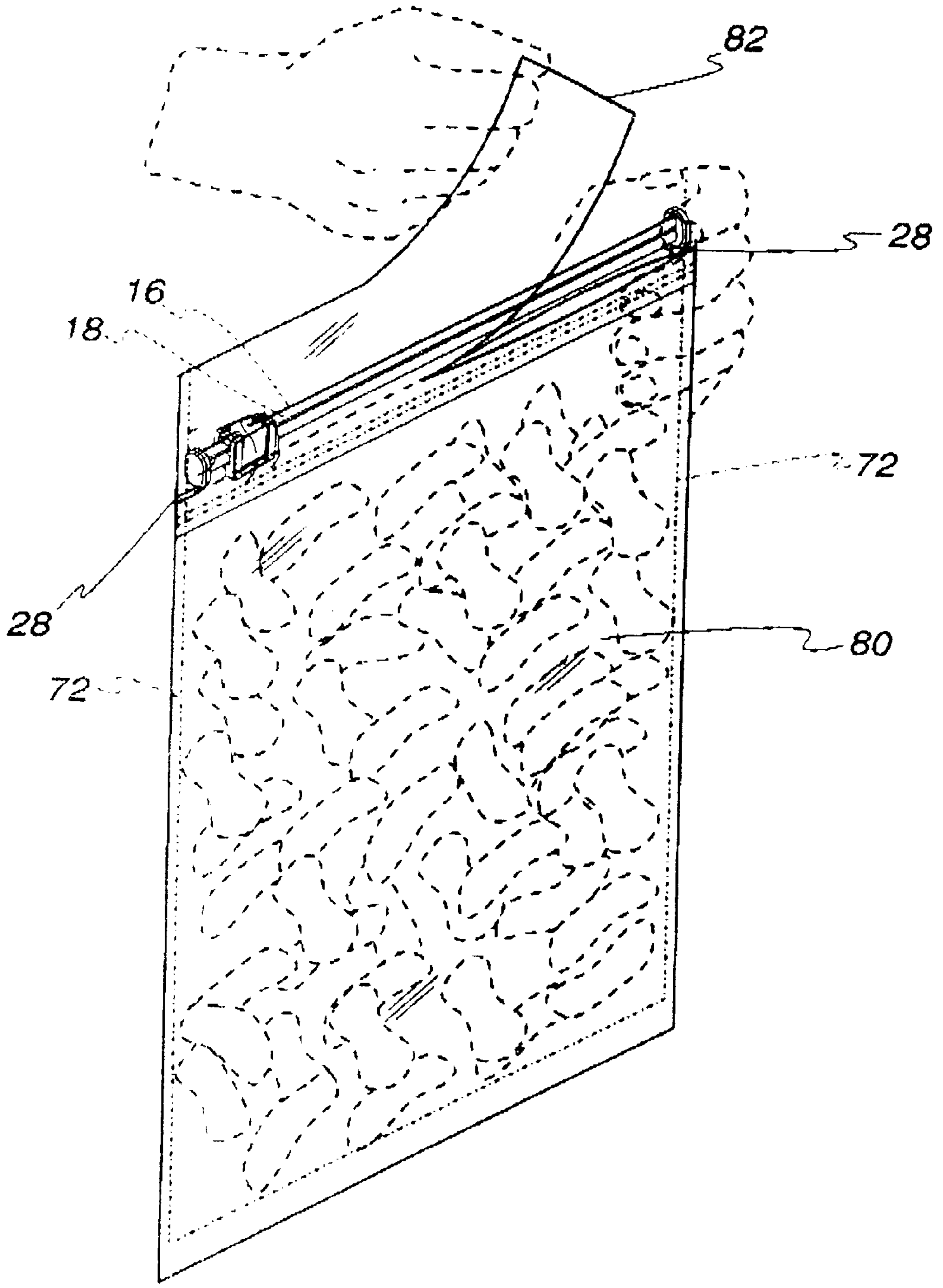
FIG. 3 depicts a finished bag produced by the form-fill-seal method after the bag's header has been partially removed by an end user.

The finished bag 80, with its header 82 partially removed by an end user, is illustrated in FIG. 3. After the header 82 is fully removed, it can be seen that each preseal 28 intersects both the adjacent side seal 72 and the fastener profiles 16 and 18. Therefore, the preseal 28 provides a leakproof barrier between an interior and an exterior of the bag 80. When the profiles 16 and 18 are interlocked but the header 82 has been removed, this leakproof barrier minimizes food spoilage and leakage of any food juices from inside the bag.

While the present invention has been described with reference to one or more particular embodiments, those skilled in the art will recognize that many changes may be made thereto without departing from the spirit and scope of the present invention. For example, the equipment used in the fastener and bag manufacturing processes may be modified so that the processes are entirely continuous with no temporary stoppages in the movement of the fastener or bag making web. Also, the fastener 10 may be attached to the web 50 prior to forming the preseal 28 and notch 38, installing the slider 40, and applying the end stops 42 and 44. To allow the fastener 10 to be accessed for such operations, however, the operations are preferably performed prior to folding the web 50 and enveloping the fastener 10 therein. Each of these embodiments and obvious variations thereof is contemplated as falling within the spirit and scope of the claimed invention, which is set forth in the following claims.

What is claimed is:

1. A method of making a fastener arrangement, comprising:

providing a fastener including first and second opposing tracks, said first and second tracks including respective first and second interlocking profiles and respective first and second fins extending downward from said respective first and second profiles;

sealing said first and second fins to each other to form spaced preseals;

after sealing said first and second fins to each other at each of said spaced preseals, forming a notch within said respective preseal and said first and second profiles at said respective preseal;

positioning a slider within each of said notches; and threading said positioned slider onto said fastener in response to relative movement of said slider and said fastener.

2. The method of claim 1, further including installing end stops on said profiles on opposite sides of each of said notches.

3. The method of claim 1, wherein said preseals at least partially encompass said respective notches to assist in providing a leakproof barrier to entry into an interior of said fastener between said fins via said notches.

4. The method of claim 1, wherein said step of sealing said first and second fins to each other at said spaced preseals includes sealing said fins to each other on opposite sides of each of said notches to be formed thereafter.

5. The method of claim 1, wherein said step of sealing said first and second fins to each other at said spaced preseals includes at least partially sealing said fins to each other beneath each of said notches to be formed thereafter.

6. The method of claim 1, wherein said step of sealing said first and second fins to each other at said spaced preseals includes sealing said fins along most of a periphery of each of said notches to be formed thereafter.

7. The method of claim 1, wherein each of said preseals is generally U-shaped.

8. The method of claim 1, wherein each of said preseals is generally solid.

9. The method of claim 1, wherein each of said preseals includes a pair of brackets separated by a gap.

10. The method of claim 1, wherein each of said notches is defined by a pair of sides and a bottom bridging said sides, said step of sealing said first and second fins to each other at said spaced preseals including sealing said fins to each other along said sides and at least a portion of said bottom.

11. The method of claim 1, further including attaching said fastener to a moving web of plastic film.

12. The method of claim 1, further including:

folding said web along a fold parallel to the direction of web movement; and sealing said folded web at bag-width distances apart along side seals that are generally transverse to the direction of web movement, said side seals being aligned with said respective notches.

13. A method of making a fastener arrangement, comprising:

providing a fastener including first and second opposing tracks, said first and second tracks including respective first and second interlocking profiles and respective first and second fins extending downward from said respective first and second profiles;

sealing said first and second fins to each other at spaced preseals;

after sealing said first and second fins to each other at each of said spaced preseals, forming a notch in said fins and said profiles at said respective preseal;

inserting a slider onto said fastener through said notch;

attaching said fastener to a moving web of plastic film; and folding said web along a fold parallel to the direction of web movement.

14. The method of claim 13, wherein said step of attaching said fastener to said moving web occurs after said steps of sealing said first and second fins and forming said notch.

15. The method of claim 13, wherein said step of attaching said fastener to said moving web occurs before said steps of sealing said first and second fins and forming said notch.

* * * * *

UNITED STATES PATENT AND TRADEMARK OFFICE

CERTIFICATE OF CORRECTION

PATENT NO. : 6,470,551 B1
DATED : October 29, 2002
INVENTOR(S) : Provan et al.

It is certified that error appears in the above-identified patent and that said Letters Patent is hereby corrected as shown below:

Title page,
Item [56], U.S. PATENT DOCUMENTS, after "4,663,915 A 5/1987" delete "Ven" and insert -- Van --

Column 8,
Line 18, delete "1" and insert -- 11 --
Line 33, delete "at" and insert -- to form --

Signed and Sealed this

First Day of April, 2003

JAMES E. ROGAN
*Director of the United States Patent and Trademark Office*